(12) United States Patent
Sato et al.

(10) Patent No.: US 11,746,956 B2
(45) Date of Patent: Sep. 5, 2023

(54) HIGH-PRESSURE TANK LINER AND METHOD OF MANUFACTURING SAME

(71) Applicants: HONDA MOTOR CO., LTD., Tokyo (JP); BRANSON ULTRASONICS CORPORATION, Danbury, CT (US)

(72) Inventors: Takaharu Sato, Wako (JP); Yuka Kishi, Wako (JP); Yusuke Sugawara, Atsugi (JP)

(73) Assignees: Honda Motor Co., Ltd., Tokyo (JP); Branson Ultrasonic Corporation, Danbury, CT (US)

( * ) Notice: Subject to any disclaimer, the term of this patent is extended or adjusted under 35 U.S.C. 154(b) by 427 days.

(21) Appl. No.: 16/957,552

(22) PCT Filed: Dec. 26, 2018

(86) PCT No.: PCT/JP2018/047795
§ 371 (c)(1),
(2) Date: Jun. 24, 2020

(87) PCT Pub. No.: WO2019/131737
PCT Pub. Date: Jul. 4, 2019

(65) Prior Publication Data
US 2020/0332960 A1   Oct. 22, 2020

(30) Foreign Application Priority Data
Dec. 26, 2017   (JP) .................. 2017-249324

(51) Int. Cl.
*B29C 65/08*   (2006.01)
*F17C 1/16*   (2006.01)
(Continued)

(52) U.S. Cl.
CPC ............... *F17C 1/16* (2013.01); *B29C 65/08* (2013.01); *B29C 65/1412* (2013.01);
(Continued)

(58) Field of Classification Search
CPC .......... F17C 2209/221; F17C 2209/232; F17C 2203/0604; F17C 1/16; B29L 2031/712;
(Continued)

(56) References Cited

U.S. PATENT DOCUMENTS

2004/0094557 A1* 5/2004 Sanders .................. F17C 1/00
                                                             220/581
2013/0220999 A1* 8/2013 Usui ................ B60K 15/03177
                                                              220/4.14

FOREIGN PATENT DOCUMENTS

JP       S55-161986       11/1980
JP       2013-119924 A    6/2013
(Continued)

OTHER PUBLICATIONS

Translation of EP 0888867, machine translation.*
(Continued)

*Primary Examiner* — Stephen J Castellano
(74) *Attorney, Agent, or Firm* — Carrier, Shende & Associates P.C.; Joseph P. Carrier; Fulchand P. Shende

(57) ABSTRACT

In the vicinity of an opening end of a first liner constituent member and a second liner constituent member made of a resin material, a flange portion is formed. After end surfaces of the opening end are abutted and joined to each other, the flange portion is removed in such a way that a part of a bottom portion remains. The remaining amount of protrusion is set such that the joint strength of a joint portion is not less than the tensile strength of the resin material or not less than the cohesion failure strength of the joint portion.

7 Claims, 9 Drawing Sheets

(51) Int. Cl.
   *B29C 65/14*  (2006.01)
   *B29C 65/74*  (2006.01)
   *B29L 31/00*  (2006.01)

(52) U.S. Cl.
   CPC ......... *B29C 65/74* (2013.01); *B29L 2031/712* (2013.01); *F17C 2203/0604* (2013.01); *F17C 2209/219* (2013.01); *F17C 2209/221* (2013.01); *F17C 2209/232* (2013.01)

(58) Field of Classification Search
   CPC ..... B29C 65/1412; B29C 65/08; B29C 65/74; B60K 2015/0346; B60K 2015/03453
   See application file for complete search history.

(56)              References Cited

FOREIGN PATENT DOCUMENTS

JP     2017-106524 A    6/2017
   WO    WO-98/01287    *   1/1998

OTHER PUBLICATIONS

PCT/ISA/210 from International Application PCT/JP2018/047795 with the English translation thereof.

Office Action dated Sep. 8, 2021 issued over the corresponding German Patent Application 11 2018 006 614.2 with the English translation thereof.

* cited by examiner

HIGH-PRESSURE TANK LINER AND METHOD OF MANUFACTURING SAME This application is the national stage (Rule 371) of international application No. PCT/JP2018/047795 filed 26 Dec. 2018.

TECHNICAL FIELD

The present invention relates to a liner for a high pressure tank (high-pressure tank liner) which is a base portion of the high pressure tank, as well as to a method of manufacturing the same.

BACKGROUND ART

A high pressure tank, for example, is provided in a fuel cell system, and stores hydrogen gas that is supplied to anodes. This type of high pressure tank includes a resin liner made of a thermoplastic resin material or the like having a hydrogen barrier property. This type of resin liner is manufactured, for example, by joining liner constituent members having substantially the same shape to each other.

More specifically, the liner constituent members are each formed of a semi-cylindrical body, one end of which is an open end, and the other end of which is a closed end which is curved in a gradually converging manner. In addition, end surfaces of the open ends are abutted against (placed in contact with) each other, and then, the end surfaces are joined together. In a conventional technique disclosed in Japanese Laid-Open Patent Publication No. 2013-119924, such joining is performed by laser welding.

Next, the resin liner which is obtained in this manner is covered with a reinforcing layer which is made of, for example, fiber reinforced resin (FRP) in which reinforcing fibers are impregnated with a resin base material. Carbon fibers are generally used as the reinforcing fibers.

SUMMARY OF INVENTION

A high pressure tank is filled with a predetermined gas such as hydrogen or the like at a high pressure. Therefore, for the joint thereof, it is necessary to have a joint strength so that breakage does not occur due to the internal pressure of the gas.

A principal object of the present invention is to provide a liner for a high pressure tank in which the joint thereof exhibits a superior joint strength.

Another object of the present invention is to provide a liner for a high pressure tank having sufficient reliability.

Yet another object of the present invention is to provide a method of manufacturing a liner for a high pressure tank in order to obtain the above-described liner for the high pressure tank.

According to one aspect of the present invention, there is provided a method of manufacturing a liner for a high pressure tank for obtaining the liner for the high pressure tank by joining two liner constituent members made of a resin material, the liner constituent members being members each including a flange member that is provided in a vicinity of an open end and includes a bottom portion protruding outwardly in a diametrical direction, and a side portion bent from the bottom portion toward a side of a closed end, an annular recess being defined by the bottom portion and the side portion, the method of manufacturing the liner for the high pressure tank comprising:

a contact step of placing end surfaces of the open ends of the two liner constituent members in contact with each other;

a joining step of joining the end surfaces of the open ends to each other by welding, and thereby obtaining a joint; and a cutting step of cutting the bottom portions and the side portions of the flange members in a manner so that parts of the bottom portions remain, wherein the flange members are left remaining with a protruding amount whereby a joint strength of the joint becomes greater than or equal to a tensile strength of the resin material.

According to another aspect of the present invention, there is provided a liner for a high pressure tank, comprising a joint formed by joining to each other open ends of two liner constituent members made of a resin material, the liner for the high pressure tank further comprising:

flange members protruding outwardly in a diametrical direction in the vicinity of the joint, wherein a joint strength of the joint is greater than or equal to a tensile strength of the resin material.

In the foregoing manner, according to the present invention, the wall thickness of the joint is increased by allowing the flange members to be left remaining. For this reason, the joint area becomes large, and by such an amount, the joint strength can be made greater than or equal to the tensile strength of the resin material. Such a feature implies that, when the high pressure gas is filled in the liner, the joint can be prevented from undergoing breakage first.

More specifically, particularly through the above-described process, a joint in which a superior joint strength is exhibited can be obtained. Therefore, the reliability of the liner for the high pressure tank, and by extension, the reliability of the high pressure tank in which such a liner is used is made sufficient.

In order to obtain the joint that exhibits the joint strength in the manner described above, for example, a protruding amount (residual protruding amount) of the flange members that are left remaining may be set so as to satisfy the following conditional expression (1). The wall thickness of the joint portion is obtained as a sum, or stated otherwise, a sum total of a wall thickness of the liner constituent members and the residual protruding amount.

$$\text{wall thickness of joint} \geq (\text{tensile strength of resin material/rupture stress of joint}) \times \text{wall thickness of liner constituent members} \quad (1)$$

Moreover, as the welding method, vibration welding, infrared heat welding, or hot plate welding is preferably used. This is because, in this case, it is easy to insert and press jigs into the annular recesses, and to generate or apply heat thereto, whereby the joining process is simple and easy to perform.

If the residual protruding amount of the flange members is excessively large, when the reinforcing layer is formed on the liner, a fibrous material contained in the reinforcing layer may be pulled by the flange members, and there is a concern that localized stresses may act thereon. In order to dispense with such a concern, it is preferable to set the residual protruding amount to be less than or equal to a difference in level allowed at a time of winding when the reinforcing layer is formed.

Further, if the corners are angular portions, there is a concern that the fibrous material may be damaged as a result of becoming caught and stretched at the corners. Therefore, it is preferable to form rounded portions (R portions) or fillet portions (C portions) at the corner portions of the flange members that are left remaining. In this case, the fibrous material is prevented from becoming caught on the corners, and thus the fibrous material is prevented from being damaged.

The joint strength of the joint may be greater than or equal to a cohesive failure strength of the joint. More specifically, according to yet another aspect of the present invention, there is provided a method of manufacturing a liner for a high pressure tank for obtaining the liner for the high pressure tank by joining two liner constituent members made of a resin material, the liner constituent members being members each including a flange member that is provided in a vicinity of an open end and includes a bottom portion protruding outwardly in a diametrical direction, and a side portion bent from the bottom portion toward a side of a closed end, an annular recess being defined by the bottom portion and the side portion, the method of manufacturing the liner for the high pressure tank comprising:

a contact step of placing end surfaces of the open ends of the two liner constituent members in contact with each other;

a joining step of joining the end surfaces of the open ends to each other by welding, and thereby obtaining a joint; and a cutting step of cutting the bottom portions and the side portions of the flange members in a manner so that parts of the bottom portions remain, wherein the flange members are left remaining with a protruding amount whereby a joint strength of the joint becomes greater than or equal to a cohesive failure strength of the joint.

According to yet a further aspect of the present invention, there is provided a liner for a high pressure tank, comprising a joint formed by joining to each other open ends of two liner constituent members made of a resin material, the liner for the high pressure tank further comprising:

flange members protruding outwardly in a diametrical direction in the vicinity of the joint, wherein a joint strength of the joint is greater than or equal to a cohesive failure strength of the joint.

According to the present invention, the flange members are provided in the vicinity of the open ends of the liner constituent members that are made of the resin material, so that after having formed the joint and obtained the liner, parts of the flange members are left remaining. For this reason, since the wall thickness of the joint becomes larger and the joint area increases, the joint strength of the joint becomes greater than or equal to the tensile strength of the resin material, or greater than or equal to the cohesive failure strength of the joint. More specifically, superior joint strength is exhibited at the joint. Therefore, it is possible to obtain a liner for the high pressure tank that exhibits sufficient reliability, and by extension, a high pressure tank in which such a liner is used.

DESCRIPTION OF EMBODIMENTS

Hereinafter, preferred embodiments of a liner for a high pressure tank according to the present invention in relation to a method of manufacturing the same will be presented and described in detail with reference to the accompanying drawings.

Figure 1:
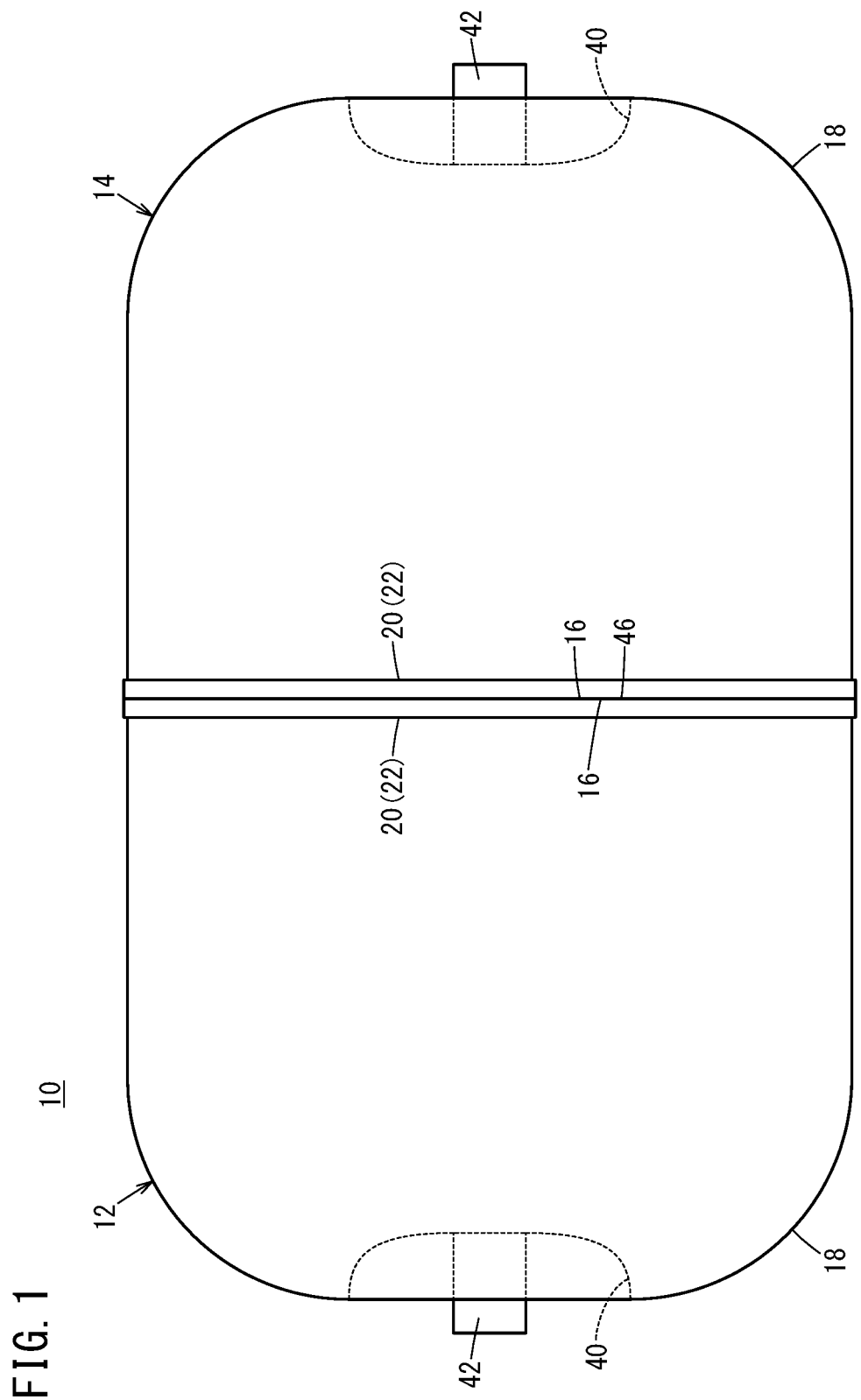
FIG. 1 is a schematic overall plan view of a liner for a high pressure tank according to an embodiment of the present invention.

FIG. 1 is a schematic overall plan view of a liner for a high pressure tank (hereinafter, also simply referred to as a "liner") 10 according to a present embodiment. The liner 10 is constituted by joining a first liner constituent member 12 and a second liner constituent member 14. According to the present embodiment, the first liner constituent member 12 and the second liner constituent member 14 have substantially the same shape as each other.

Figure 2:
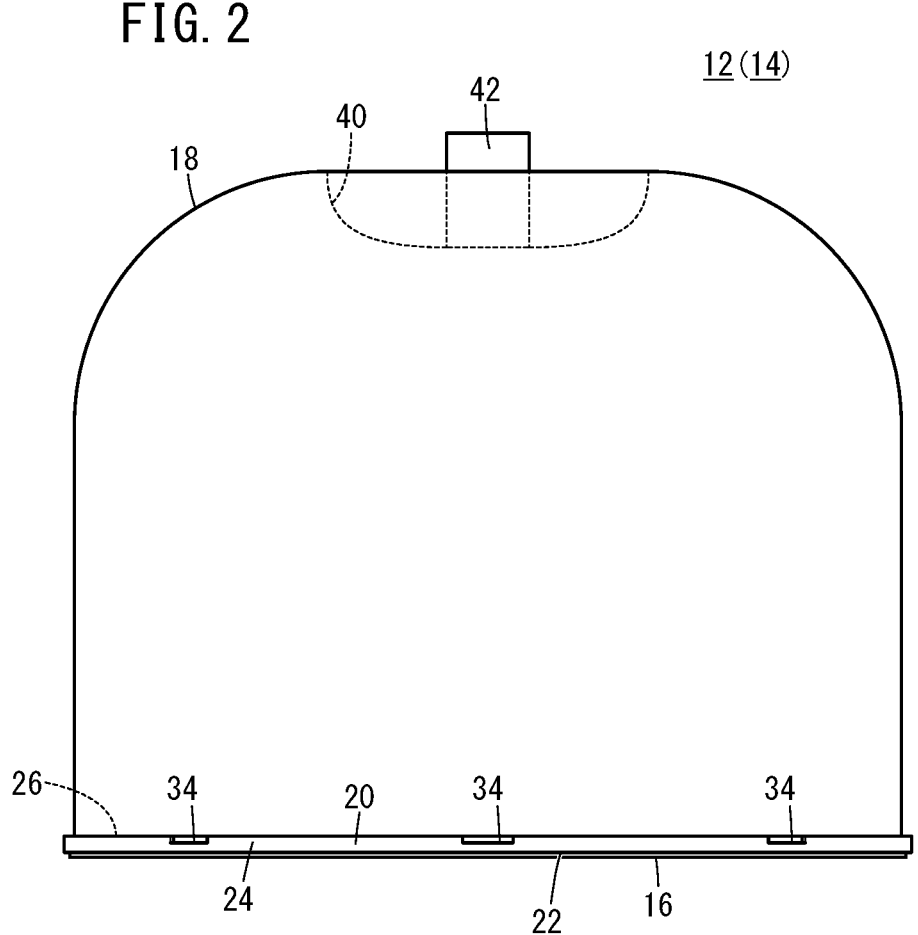
FIG. 2 is a schematic overall plan view of a liner constituent member that constitutes part of the liner for the high pressure tank shown in FIG. 1.

Initially, a description will be given concerning the first liner constituent member 12 and the second liner constituent member 14. FIG. 2 is a schematic overall plan view of the first liner constituent member 12 prior to joining. The first liner constituent member 12 is a semi-cylindrical body having a hollow interior, one end of which is an open end 16, and the other end of which is a closed end 18 which is closed in a gradually converging manner. In the vicinity of the open end 16, a flange member 20 is formed so as to protrude outwardly in a diametrical direction.

Figure 3:
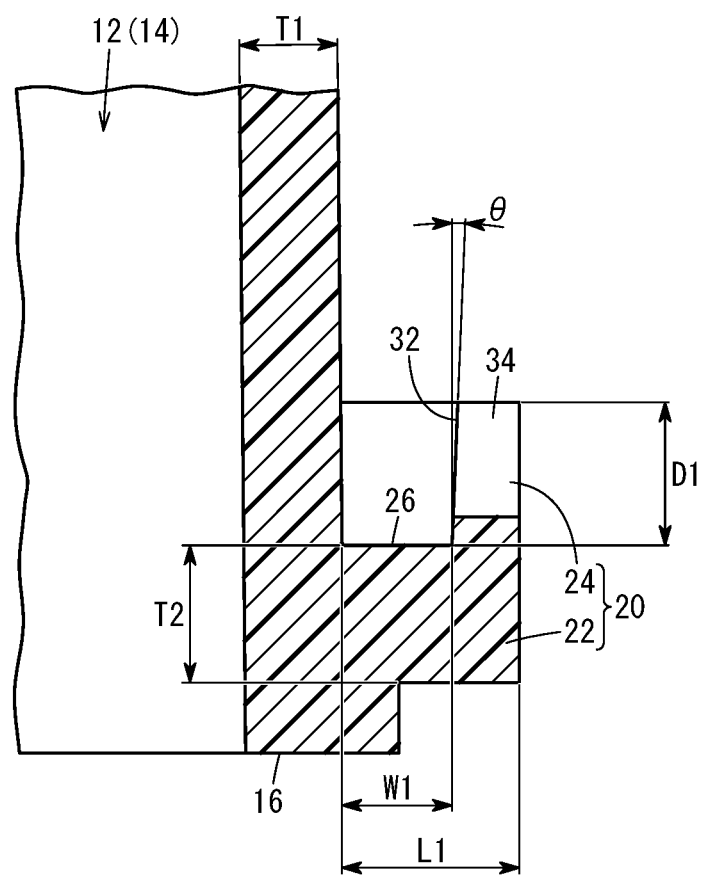
FIG. 3 is an enlarged cross-sectional view of essential components in which the vicinity of a flange member shown in FIG. 2 is enlarged.

FIG. 3 is an enlarged cross-sectional view of essential components in which the vicinity of a flange member 20 is enlarged. Moreover, T1 in FIG. 3 represents a wall thickness of a side wall of the first liner constituent member 12 (main body).

The flange member 20 is provided in an annular shape at a position that is slightly offset from the end surface of the open end 16 toward the side of the closed end 18. Further, the flange member 20 includes a bottom portion 22 that extends along the diametrical direction, and a side portion 24 that is bent from the bottom portion 22 so as to be directed toward the side of the closed end 18. An annular recess 26 is defined by the bottom portion 22 and the side portion 24. More specifically, the annular recess 26 is a space formed between the main body side wall of the first liner constituent member 12 and the side portion 24 of the flange member 20.

In the case that the first liner constituent member 12 and the second liner constituent member 14 are joined together by vibration welding, a width W1 and a depth D1 of the annular recesses 26 thereof may be set in a manner so that vibration welding jigs 30 (see FIG. 4) can be inserted therein. Further, a thickness T2 of the bottom portions 22 may be set to such an extent that the flange members 20 are not damaged during vibration welding. An initial protruding amount L1 of the flange member 20 (the distance from the outer surface of the main body side wall of the first liner constituent member 12 to the outer surface of the side portion 24 of the flange member 20) can be set, for example, to 1 to 3 times, and typically about 1.5 times, the wall thickness T1 of the first liner constituent member 12.

On the inner surfaces of the side portion 24 facing the annular recess 26, a slope 32 which is inclined at a predetermined angle θ in a direction away from the annular recess 26 is formed. Such a slope 32 serves to facilitate detachment of the vibration welding jigs 30 (see FIG. 4), and is referred to as a so-called draft angle.

Further, as shown in FIG. 2, cutouts 34 are formed in the side portion 24 by cutting out parts of the side portion 24. For example, a rotation preventing jig is engaged with the cutouts 34.

A depression 40, which is recessed toward the side of the open end 16, is formed on the closed end 18 on a top surface thereof. At a bottom part of the depression 40, a boss member 42 is provided that extends in a projecting manner toward a side away from the open end 16.

As noted previously, the second liner constituent member 14 is configured in conformity with the first liner constituent member 12. Accordingly, the same components as those of the first liner constituent member 12 are designated by the same reference numerals, and detailed description of such features will be omitted.

Next, a description will be given concerning a method of manufacturing according to the present embodiment for obtaining the liner 10 shown in FIG. 1 from the first liner constituent member 12 and the second liner constituent member 14, which are configured in the manner described above.

The first liner constituent member 12 and the second liner constituent member 14 are manufactured, for example, by performing injection molding using a molten resin material in a non-illustrated injection molding device. As suitable examples of the resin material, there may be cited a high-density polyethylene (HDPE) resin, which is a thermoplastic resin having a hydrogen barrier property. Moreover, it is a matter of course that the boss members 42 and the flange members 20 are integrally molded with the main bodies. The slopes 32 and the cutouts 34 are also formed at the same time that molding is performed.

In the case that the first liner constituent member 12 and the second liner constituent member 14 are of the same shape, both of such members can be manufactured using the same mold. Therefore, since there is no need to prepare a plurality of molds, the cost of the mold can be reduced.

Figure 4:
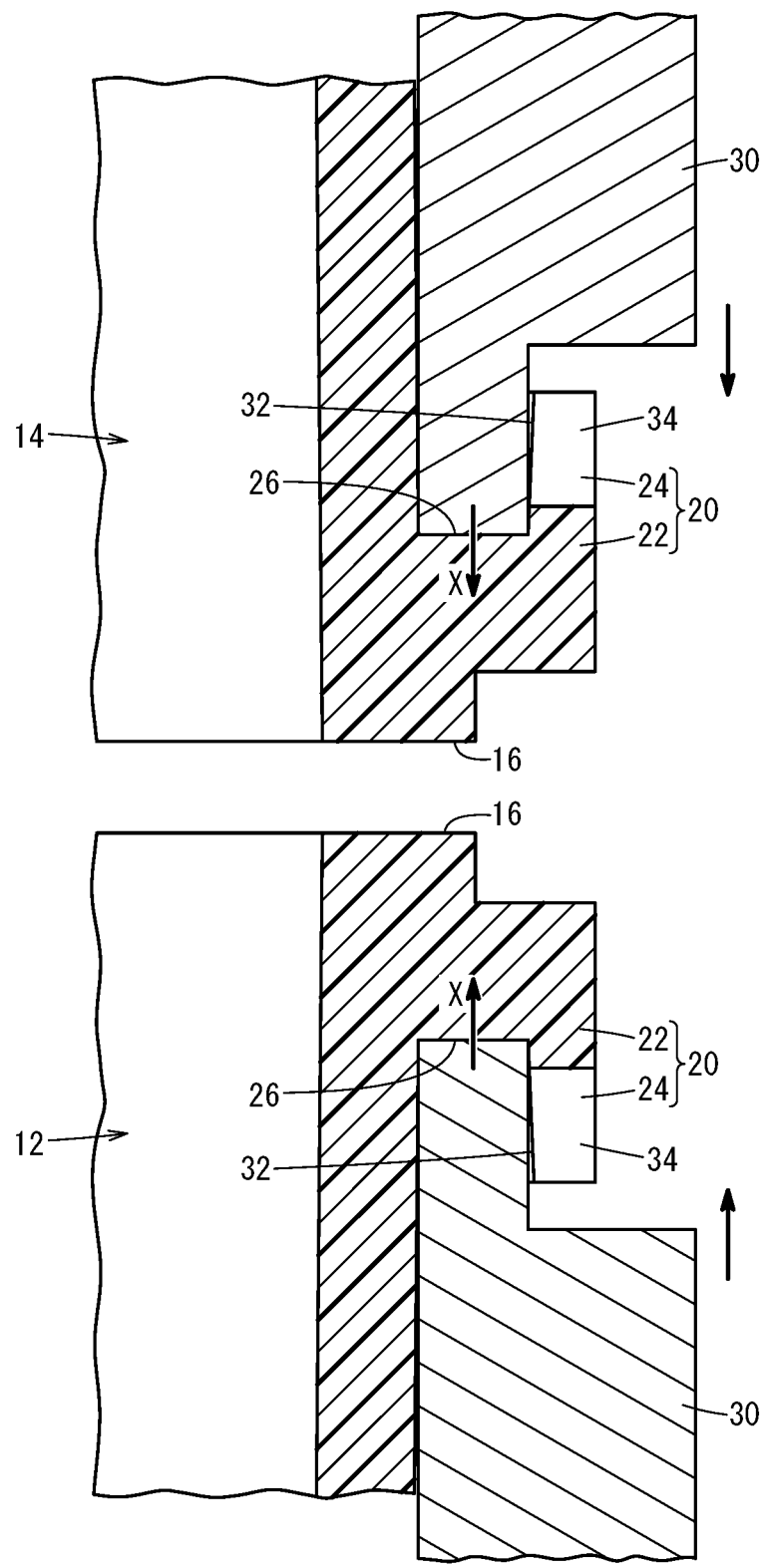
FIG. 4 is an enlarged cross-sectional view of essential components showing a state in which vibration welding jigs are inserted into annular recesses formed in flange members.

The first liner constituent member 12 and the second liner constituent member 14 which are obtained in the foregoing manner are placed in opposition to each other, in a manner so that the end surfaces of the open ends 16 are separated from each other at a predetermined distance. In the case that vibration welding is carried out, next, as shown in FIG. 4, vibration welding jigs 30 are inserted into the annular recesses 26. If necessary, a non-illustrated rotation preventing jig is engaged with the cutouts 34 that are formed in the side portions 24 of the flange members 20. This is preferable because, in accordance therewith, the first liner constituent member 12 and the second liner constituent member 14 are prevented from rotating, and the subsequent process steps are facilitated.

Figure 5:
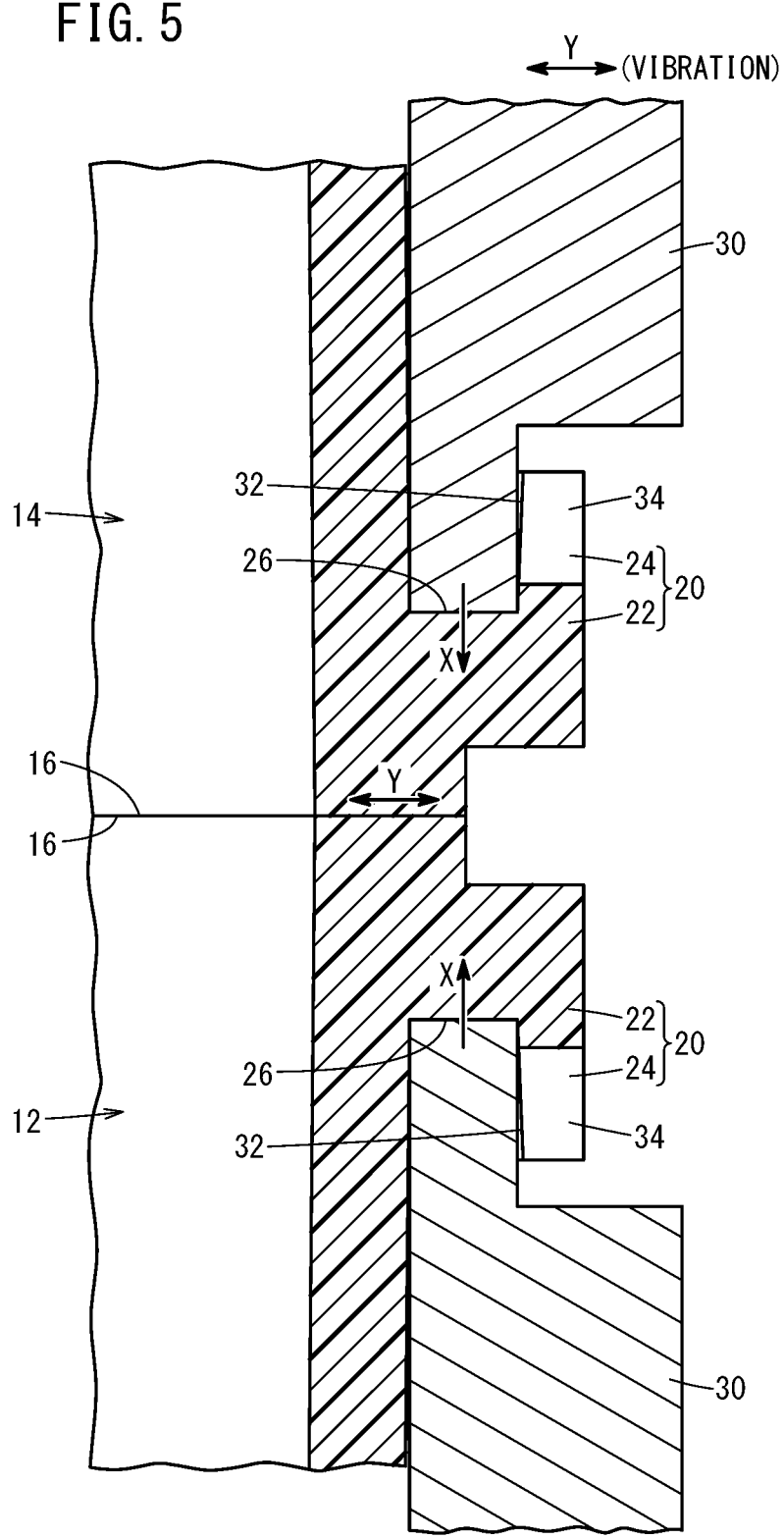
FIG. 5 is an enlarged cross-sectional view of essential components showing a state in which end surfaces of open ends of liner constituent members are placed in contact with each other.

Next, the vibration welding jigs 30 are biased to press the respective flange members 20 of the first liner constituent member 12 and the second liner constituent member 14 in the directions of the arrows X, and the first liner constituent member 12 and the second liner constituent member 14 are brought into close proximity to each other. Consequently, as shown in FIG. 5, the end surfaces of the open ends 16 are placed in contact with (abutted against) each other. Stated otherwise, a contact step is carried out, and a contact site is formed.

Figure 6:
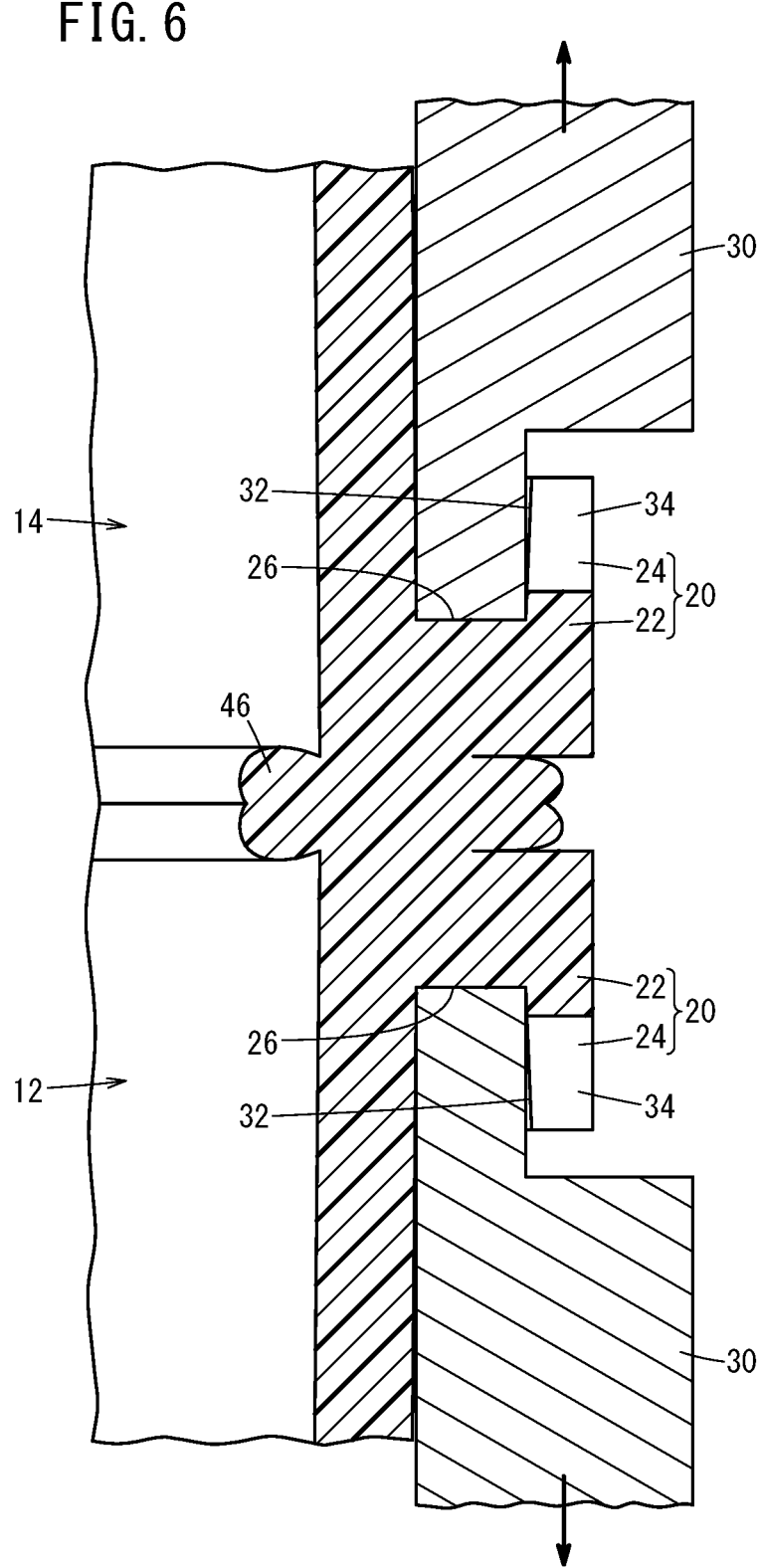
FIG. 6 is an enlarged cross-sectional view of essential components, continuing from FIG. 5, and showing a state in which the vicinity of the open ends is slightly compressed.

Next, a joining step is performed. More specifically, as indicated by the arrow Y in FIG. 5, one of the vibration welding jigs 30 inside the annular recesses 26, for example, the one on the upper side, is vibrated along a diametrical direction of the first liner constituent member 12. Consequently, frictional heat is generated at the contact site, and as a result, the contact site is softened or melted. Since the vibration welding jigs 30 in the annular recesses 26 press the first liner constituent member 12 and the second liner constituent member 14 in directions to approach each other, as shown in FIG. 6, both of such members 12 and 14 are compressed into close proximity to each other. Accompanying such compression, the resin material which has been softened or melted leaks out on the side of the inner peripheral wall or on the side of the outer peripheral wall.

It should be noted that the vibration welding jig 30 on the lower side may also be vibrated along a diametrical direction of the second liner constituent member 14. Further, assuming that it is possible to cause the vibration welding jigs 30 to be vibrated or rotated in a circumferential direction of the first liner constituent member 12 and the second liner constituent member 14, such an action may also be performed.

Imparting of vibration is stopped after a predetermined time period has elapsed. Further, after a required time period for pressing has elapsed, the vibration welding jigs 30 are raised or lowered along the vertical directions, and are separated away from the annular recesses 26. At this time, since the slopes 32 are formed on the side portions 24, the vibration welding jigs 30 can be easily separated from the annular recesses 26. Then, the softened or melted resin material is cooled and solidified. More specifically, joining is performed at the contact site, and a joint 46 is obtained.

Next, a cutting step is performed. In this instance, according to the conventional technique, the flange members 20 are cut off from a base end, and grinding or polishing is carried out so that the site where the flange members 20 are provided is made flush with the main body side wall. Stated otherwise, the flange members 20 are not left remaining.

Figure 7:
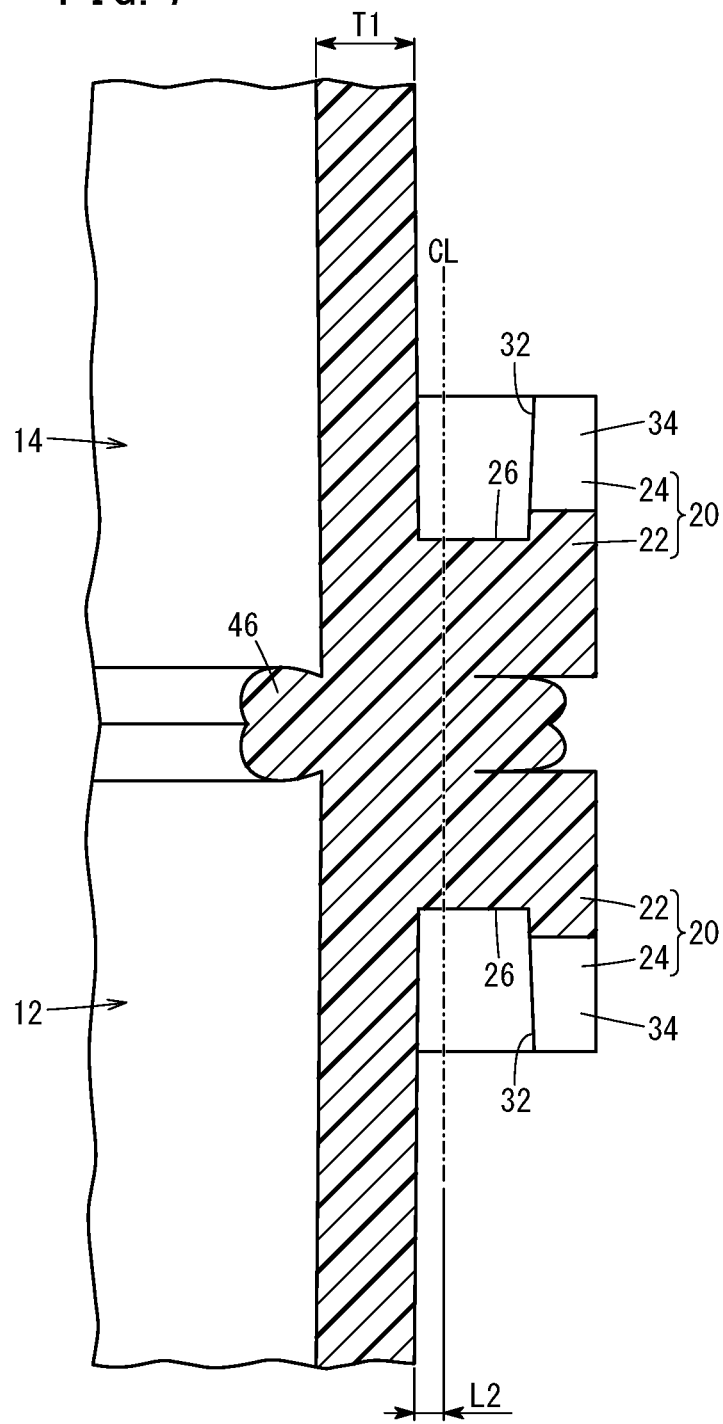
FIG. 7 is an enlarged cross-sectional view of essential components showing a state in which the vibration welding jigs are detached from the annular recesses together with obtaining a joint.

In contrast thereto, according to the present embodiment, the cutting step of cutting along a cutting line CL is carried out in a manner so that portions of the flange members 20 remain. In this instance, the position of the cutting line CL (the amount by which the flange members 20 are cut), or in other words, a residual protruding amount L2 shown in FIG. 7, is set so that the joint strength of the joint 46 is greater than or equal to the tensile strength of the resin material. The tensile strength of the resin material can be obtained from a tensile test according to the Japanese Industrial Standard (JIS), using a test piece made up from a single member that does not have the joint 46 therein.

In order to ensure that the joint strength of the joint 46 is greater than the tensile strength of the resin material, the tensile test is performed using a test piece that is cut out so as to include the joint 46 therein, and the residual protruding amount L2 of the flange members 20 may be set on the basis of the stress (rupture stress) at the time that breakage occurs. Moreover, the tensile strength and the rupture stress may be average values obtained by conducting the test a plurality of times, or may be calculated values obtained by subtracting values of four times the standard deviation from the average values.

More specifically, when a sum total of the residual protruding amount L2 of the flange members 20 and the wall thickness T1 of the main body side wall is defined as a wall thickness of the joint 46, the values of the tensile strength and the rupture stress may be set to the values satisfying the following expression (1).

$$\text{wall thickness of joint }46 \geq (\text{tensile strength of resin material}/\text{rupture stress of joint }46) \times T1 \quad (1)$$

For example, if a value calculated by calculating the right side of expression (1) is 3.4 mm, the minimum residual protruding amount L2 of the flange members 20 becomes (3.4−T1) mm. More specifically, it is sufficient if the bottom portions 22 of the flange members 20 are cut off with an appropriate cutting tool, so that the flange members 20 protrude by (3.4−T1) mm from the outer peripheral wall of the main body side wall. Moreover, the residual protruding amount L2 is preferably less than or equal to a difference in level allowed at a time of winding when the reinforcing layer is formed.

Figure 8:
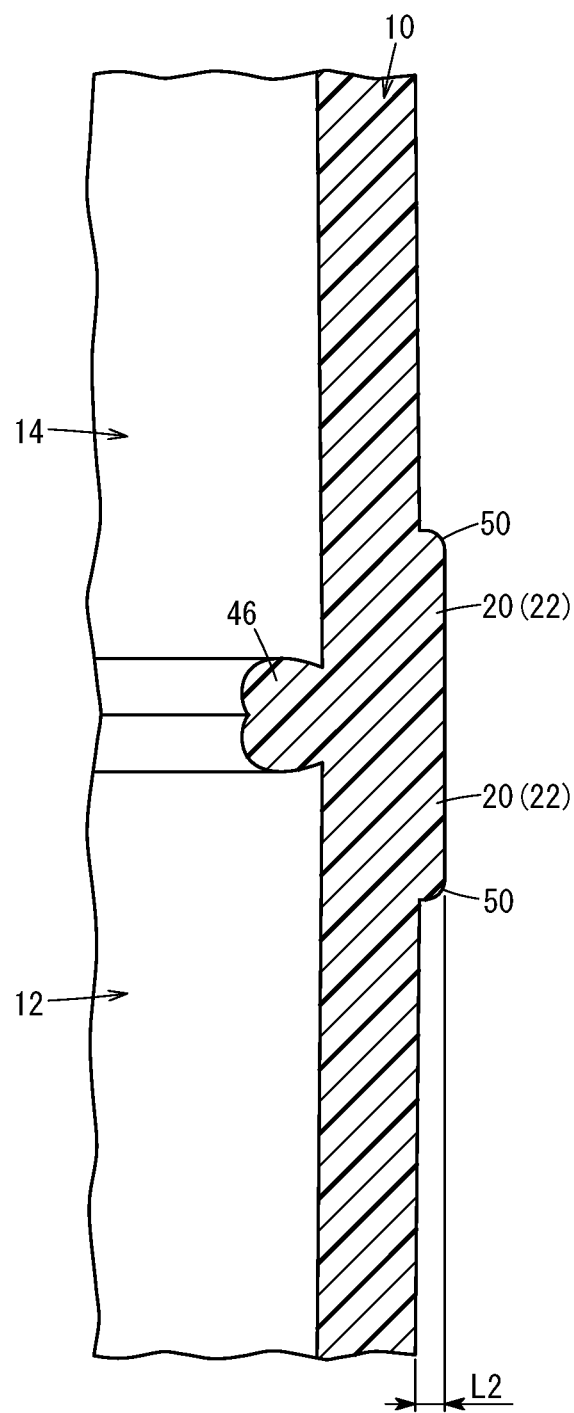
FIG. 8 is an enlarged cross-sectional view of essential components showing a state in which the flange members are cut off so that parts of bottom portions thereof remain.
Figure 9:
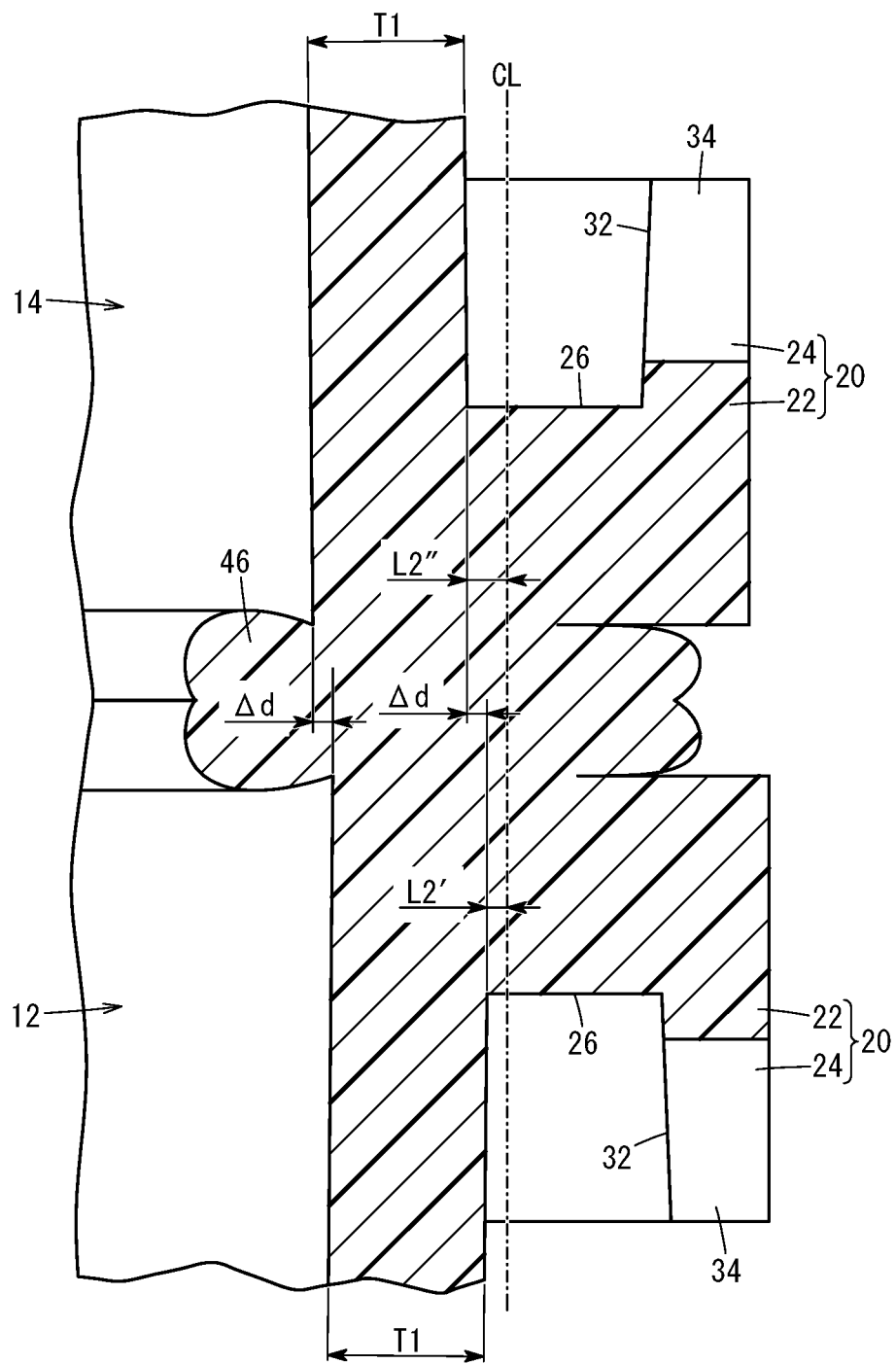
FIG. 9 is an enlarged cross-sectional view of essential components showing a state in which positional shifting is generated between the end surfaces of the open ends of the liner constituent members.

Along with the above-described cutting, the side portions 24 and the majority of the bottom portions 22 are cut off to thereby bring about the state shown in FIG. 8, whereby the liner 10 shown in FIG. 1 is obtained. In this instance, as shown in an exaggerated manner in FIG. 9, in the case that the end surfaces are slightly shifted in position from each other, for example, a residual protruding amount L2" of the second liner constituent member 14 becomes smaller than that of the first liner constituent member 12 by an amount of positional shifting. More specifically, when the amount of positional shifting is given by Δd, a residual protruding amount L2' of the first liner constituent member 12 is a value obtained by subtracting Δd from the residual protruding amount L2" of the second liner constituent member 14. In this case, a sum total of the wall thickness T1 of the first liner constituent member 12 and the residual protruding amount L2' becomes the wall thickness of the joint 46.

It is preferable to create fillets on the corner portions of the flange members 20 (bottom portions 22) that are left remaining, and thereby form the rounded portions (R portions) 50. Stated otherwise, it is preferable to bend the corner portions of the bottom portions 22 that are left remaining.

Furthermore, the reinforcing layer that covers the liner 10 is provided and valves are attached to the boss members 42, whereby the high pressure tank is manufactured. At this time, if the residual protruding amount L2 of the flange members 20 is less than or equal to the difference in level, stresses that act from the flange members 20 on the fibrous material (carbon fibers or the like) contained in the reinforcing layer become less than or equal to an allowable range. Further, there is a concern that, if the corners of the flange members 20 are angular portions, the fibrous material (carbon fibers or the like) may become caught on the corners and be locally stretched thereby, and damage to the fibrous material may occur. However, in the case that the rounded portions (R portions) 50 are formed in the manner described above, such a concern can be dispensed with.

In this high pressure tank, the joint strength of the joint 46 of the liner 10 is greater than or equal to the tensile strength of the resin material that forms the base material of the first liner constituent member 12 and the second liner constituent member 14. Accordingly, when the high pressure gas is filled in the liner 10, the joint 46 is prevented from undergoing breakage first. Since portions other than the joint 46 of the liner 10 are made of a resin material having sufficient pressure resistance with respect to the filling pressure, ultimately, the joint 46 also exhibits sufficient pressure resistance with respect to the filling pressure. Stated otherwise, a high pressure tank that exhibits sufficient reliability can be obtained.

In contrast to the features stated above, it is also assumed that there may be cases in which it is difficult to set the residual protruding amount L2 of the flange members 20 to be large, such as when it is desired to make the difference in level as small as possible at the time of filament winding. In such a case, the residual protruding amount L2 of the flange members 20 may be set in a manner so that the joint strength of the joint 46 is greater than or equal to the cohesive failure strength of the joint 46. In this case as well, since the joint 46 is prevented from undergoing breakage first when the high pressure gas is filled in the liner 10, a high pressure tank that exhibits sufficient reliability can be obtained.

The present invention is not particularly limited to the above-described embodiments, and various modifications can be made thereto within a range that does not deviate from the essence and gist of the present invention.

For example, instead of the rounded portions (R portions) 50, fillet portions (C portions) may be formed.

Further, the first liner constituent member 12 and the second liner constituent member 14 may be formed in different shapes from each other.

Furthermore, instead of vibration welding, infrared heat welding may be performed, or vibration welding and infrared heat welding may be used in combination. In the case of performing infrared heat welding, tools for performing infrared heat welding may be inserted into the annular recesses 26. Alternatively, hot plate welding may be performed.

EXPLANATION OF REFERENCE NUMERALS

10 . . . liner for high pressure tank
12, 14 . . . liner constituent members
16 . . . open ends
18 . . . closed ends
20 . . . flange members
22 . . . bottom portions
24 . . . side portions
26 . . . annular recesses
30 . . . vibration welding jigs
32 . . . slopes
34 . . . cutouts
46 . . . joint
50 . . . rounded portions (R portions)

The invention claimed is:

1. A method of manufacturing a liner for a high pressure tank for obtaining the liner for the high pressure tank by joining two liner constituent members made of a resin material, the liner constituent members being members each including a flange member that is provided in a vicinity of an open end and includes a bottom portion protruding outwardly in a diametrical direction, and a side portion bent from the bottom portion toward a side of a closed end, an annular recess being defined by the bottom portion and the side portion, the method of manufacturing the liner for the high pressure tank comprising:

a contact step of placing end surfaces of the open ends of the two liner constituent members in contact with each other;

a joining step of joining the end surfaces of the open ends to each other by welding, and thereby obtaining a joint; and a cutting step of cutting the bottom portions and the side portions of the flange members in a manner so that parts of the bottom portions remain, wherein the flange members are left remaining with a protruding amount whereby a joint strength of the joint obtained from a tensile test becomes greater than or equal to a tensile strength of the resin material.

2. The method of manufacturing the liner for the high pressure tank according to claim 1, wherein, when a sum total of a wall thickness of the liner constituent members and a protruding amount of the flange members that are left remaining is defined as a wall thickness of the joint, the protruding amount of the flange members that are left remaining is set so that the wall thickness of the joint satisfies a conditional expression below:

wall thickness of joint≥(tensile strength of resin material/stress of joint obtained from a tensile test)×wall thickness of liner constituent members.

3. The method of manufacturing the liner for the high pressure tank according to claim 1, wherein the welding is performed by vibration welding, infrared heat welding, or hot plate welding.

4. The method of manufacturing the liner for the high pressure tank according to claim 1, wherein the flange members are left remaining with a protruding amount of less than or equal to a difference in level allowed at a time of winding when a reinforcing layer is formed.

5. The method of manufacturing the liner for the high pressure tank according to claim 1, wherein an R portion or a C portion is formed at corner portions of the flange members that are left remaining.

6. The method of manufacturing the liner for the high pressure tank according to claim 1, wherein the liner constituent members are members in which slopes inclined in a direction away from the annular recesses are formed on inner surfaces of the side portions facing the annular recesses.

7. The method of manufacturing the liner for the high pressure tank according to claim 1, wherein the liner constituent members are members in which cutouts made by cutting out parts of the side portions are formed in the side portions.

* * * * *